(12) United States Patent
Bodurow et al.

(10) Patent No.: US 10,749,462 B2
(45) Date of Patent: Aug. 18, 2020

(54) HYBRIDIZED CANOPY

(71) Applicant: studio [Ci], Detroit, MI (US)

(72) Inventors: Constance Bodurow, Detroit, MI (US); Andrew Bradford, Detroit, MI (US)

( * ) Notice: Subject to any disclaimer, the term of this patent is extended or adjusted under 35 U.S.C. 154(b) by 0 days.

(21) Appl. No.: 16/235,495

(22) Filed: Dec. 28, 2018

(65) Prior Publication Data

US 2019/0207552 A1    Jul. 4, 2019

Related U.S. Application Data

(60) Provisional application No. 62/612,330, filed on Dec. 30, 2017.

(51) Int. Cl.
| | | |
|---|---|---|
| E04H 15/58 | (2006.01) |
| E04H 15/34 | (2006.01) |
| H02S 20/30 | (2014.01) |
| H02S 20/22 | (2014.01) |
| E04D 13/064 | (2006.01) |
| E04D 13/04 | (2006.01) |
| E04H 15/54 | (2006.01) |
| F24S 25/12 | (2018.01) |
| H02S 99/00 | (2014.01) |
| H02S 20/10 | (2014.01) |

(52) U.S. Cl.
CPC .......... *H02S 20/30* (2014.12); *E04D 13/0445* (2013.01); *E04D 13/0645* (2013.01); *E04H 15/34* (2013.01); *E04H 15/54* (2013.01); *E04H 15/58* (2013.01); *F24S 25/12* (2018.05); *H02S 20/10* (2014.12); *H02S 20/22* (2014.12); *H02S 99/00* (2013.01); *E04D 2013/0495* (2013.01)

(58) Field of Classification Search
CPC .......... H02S 20/30; H02S 20/10; H02S 20/22; F24S 25/12; E04H 15/58; E04H 15/34
See application file for complete search history.

(56) References Cited

U.S. PATENT DOCUMENTS

| | | | |
|---|---|---|---|
| 7,285,719 B2 * | 10/2007 | Conger | F24S 25/50 |
| | | | 136/245 |
| D631,004 S | 1/2011 | Johnson | |
| D633,033 S | 2/2011 | Conger | |
| D649,930 S | 12/2011 | Lindor | |

(Continued)

OTHER PUBLICATIONS

Anna Asiala, "Net Zero Structures," Locations referenced Alameda, CA and Beirut, Lebanon. Allied Design Studio, Fall 2014. Professor Bodurow.

(Continued)

*Primary Examiner* — Paola Agudelo
(74) *Attorney, Agent, or Firm* — Luis Figarella (57) ABSTRACT

An example canopy includes a plurality of panels arranged in a plurality of rows and a plurality of sequences, including a first sequence, second sequence, and a third sequence. The second sequence is disposed between the first and third sequences and forms a rainwater collection channel The panels of the second sequence are angled with respect to the panels of the first and third sequences to optimize solar radiation and rainwater collection efficiency. Photovoltaic cells are provided on a flexible top surface of some or all of the panels. A hybrid canopy, a method of making a hybrid canopy, and a method of using and learning from a hybrid canopy, are shown and described.

2 Claims, 13 Drawing Sheets

(56) References Cited

U.S. PATENT DOCUMENTS

| | | | |
|---|---|---|---|
| D672,472 S | 12/2012 | Dolceamore et al. | |
| D712,344 S | 9/2014 | Ilzhoefer | |
| 8,875,450 B2* | 11/2014 | Conger | H01L 31/042 |
| | | | 52/146 |
| 8,991,117 B1 | 3/2015 | Walker et al. | |
| 9,016,292 B1 | 4/2015 | Schneider et al. | |
| D734,870 S | 7/2015 | Scorsone et al. | |
| D738,820 S | 9/2015 | Beck et al. | |
| 9,127,468 B2 | 9/2015 | Muroi | |
| 9,153,718 B2 | 10/2015 | Richardson | |
| 9,556,857 B2 | 1/2017 | Cole et al. | |
| D789,552 S | 6/2017 | Scorsone et al. | |
| 9,683,539 B2 | 6/2017 | Calabro | |
| D850,362 S * | 6/2019 | Bodurow | D13/102 |
| 2007/0262204 A1* | 11/2007 | Beidleman | B64G 1/222 |
| | | | 244/172.6 |
| 2010/0000165 A1* | 1/2010 | Koller | A01G 9/243 |
| | | | 52/173.3 |
| 2010/0089433 A1* | 4/2010 | Conger | F24S 25/50 |
| | | | 136/244 |
| 2011/0139601 A1 | 6/2011 | Johnstone | |
| 2011/0253614 A1 | 10/2011 | Curran et al. | |
| 2013/0205778 A1 | 8/2013 | Hansen | |
| 2016/0270304 A1 | 9/2016 | Higgins | |
| 2017/0070188 A1* | 3/2017 | Meyer | H01L 31/042 |

OTHER PUBLICATIONS

Mark Bolin, "Net Zero Energy or NZE" Websites referenced: http://www.satiretimes.com, http://americandreamgeothermal.com, http://water.usgs.gov, http://3.bp.blogspot/com, http://www.darvil.clara.net, http://s3.amazonaws.com, Allied Design Studio, Fall 2014. Professor Bodurow.

Mohammed Abusitta, "Net Zero Energy: San Ysidro Port of Entry," Websites referenced: www.millerhull.com/html/inporgress/sanysidro.htm, http://interfaceengineering.com, https://www.candela.com, Allied Design Studio, Fall 2014. Professor Bodurow.

James Pattison, "Net Zero Energy," Websites referenced: http://gsa.gov, http://www.dreiseitl.com, http://archrecord.construction.com; http://www.mbarconline.com, Allied Design Studio, Fall 2014. Professor Bodurow.

Zerbst, "Spotlight Solar 'Trees,'" Websites referenced: http:/www.spotlightsolar.com/whatsnew/2013/4/18/beond-net-zero-energy.html, http://www.spotlightsolar.com/products/lift/13630979. Allied Design Studio, Fall 2014. Professor Bodurow.

* cited by examiner

HYBRIDIZED CANOPY

CROSS-REFERENCE TO RELATED APPLICATION

This application claims the benefit of U.S. Provisional Patent Application No. 62/612,330 which was filed on Dec. 30, 2017, and is incorporated by reference herein in its entirety.

BACKGROUND

This application relates to canopies, and more particularly to a solar canopy that also provides for rainwater collection.

Traditionally, solar panels, whether ground or roof-mounted, have been utilized in a planar formation, where a plurality of solar panels are arranged in a rectangular grid, and the entire grid is oriented at a particular angle.

SUMMARY

A canopy according to an example of the present disclosure includes a plurality of panels arranged in a plurality of rows and a plurality of sequences, including a first sequence, second sequence, and a third sequence. The second sequence is disposed between the first and third sequences and provides a rainwater collection channel. The first and third sequences are angled with respect to the second sequence to optimize solar radiation and rainwater collection efficiency and direct rainwater toward the rainwater collection channel. Photovoltaic cells are provided on a top surface of some or all of the panels.

In a further embodiment of any of the foregoing embodiments, the canopy has opposing first and second edges that are sloped, each row extends from the first edge to the second edge, the first edge lies within a first plane, the second edge lies within a second plane, and the first and second planes are approximately parallel to each other.

In a further embodiment of any of the foregoing embodiments, includes a majority of one of the first and second edges has a greater height than a majority of the other of the first and second edges.

In a further embodiment of any of the foregoing embodiments, the canopy has opposing first and second ends, at least one of which is sloped, and each row extends from the first end to the second end. The first end lies within a third plane and the second end lies within a fourth plane. The third and fourth planes are approximately parallel to each other and are approximately perpendicular to the first and second planes.

In a further embodiment of any of the foregoing embodiments, a majority of one of the first and second ends has a greater height than a majority of the other of the first and second ends.

In a further embodiment of any of the foregoing embodiments, the first sequence meets the second sequence at a first interface that is sloped and disposed within a fifth plane, and the third sequence meets the second sequence at a second interface that is sloped and disposed within a sixth plane. The first, second, fifth, and sixth planes are approximately parallel to each other.

In a further embodiment of any of the foregoing embodiments, the plurality of rows meet each other at row interfaces that are sloped, and the plurality of row interfaces disposed within respective planes that are approximately parallel to each other and the third and fourth planes.

In a further embodiment of any of the foregoing embodiments, the second sequence has opposing first and second ends, and the panels of the second sequence slope downward from the first end to the second end.

In a further embodiment of any of the foregoing embodiments, the rainwater collection channel in fluid communication with a cistern.

In a further embodiment of any of the foregoing embodiments, a gutter is disposed along a portion of the second end of the second sequence, and the gutter fluidly connects the rainwater collection channel to the cistern.

In a further embodiment of any of the foregoing embodiments, the cistern includes a bladder, and the rainwater collection channel is in fluid communication with the bladder.

In a further embodiment of any of the foregoing embodiments, the bladder is provided within a hollow support post that supports the canopy.

In a further embodiment of any of the foregoing embodiments, the canopy includes a canopy support frame, a plurality of struts having opposing first and second ends, and a plurality of support posts that elevate the canopy support frame. The first ends are secured to the panels, and the second ends are secured to the canopy support frame.

In a further embodiment of any of the foregoing embodiments, the support posts have respective opposing first and second ends, the second ends are secured to the canopy support frame, and the support posts taper from the first end to the second end.

In a further embodiment of any of the foregoing embodiments, at least one of the canopy support frames and the plurality of support posts are hollow.

In a further embodiment of any of the foregoing embodiments, each panel includes a four-sided panel support frame, the first ends of the plurality of struts are secured to corners of the panel support frames, and the second ends of the plurality of struts are secured to the canopy support frame via a plurality of support plates, each support plate and its corresponding struts forming a respective yoke.

In a further embodiment of any of the foregoing embodiments, the panel support frames are hollow.

In a further embodiment of any of the foregoing embodiments, the panels include a substrate fabric, and the photovoltaic cells are provided on a photovoltaic film secured to the substrate fabric.

In a further embodiment of any of the foregoing embodiments, the photovoltaic film includes a plurality of strips of photovoltaic film arranged in rows that are generally parallel to each other.

In a further embodiment of any of the foregoing embodiments, the plurality of rows and sequences of panels form a canopy unit, and a plurality of the canopy units are arranged adjacent to each other end-to-end, side-by-side, or both, to provide an extended canopy.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
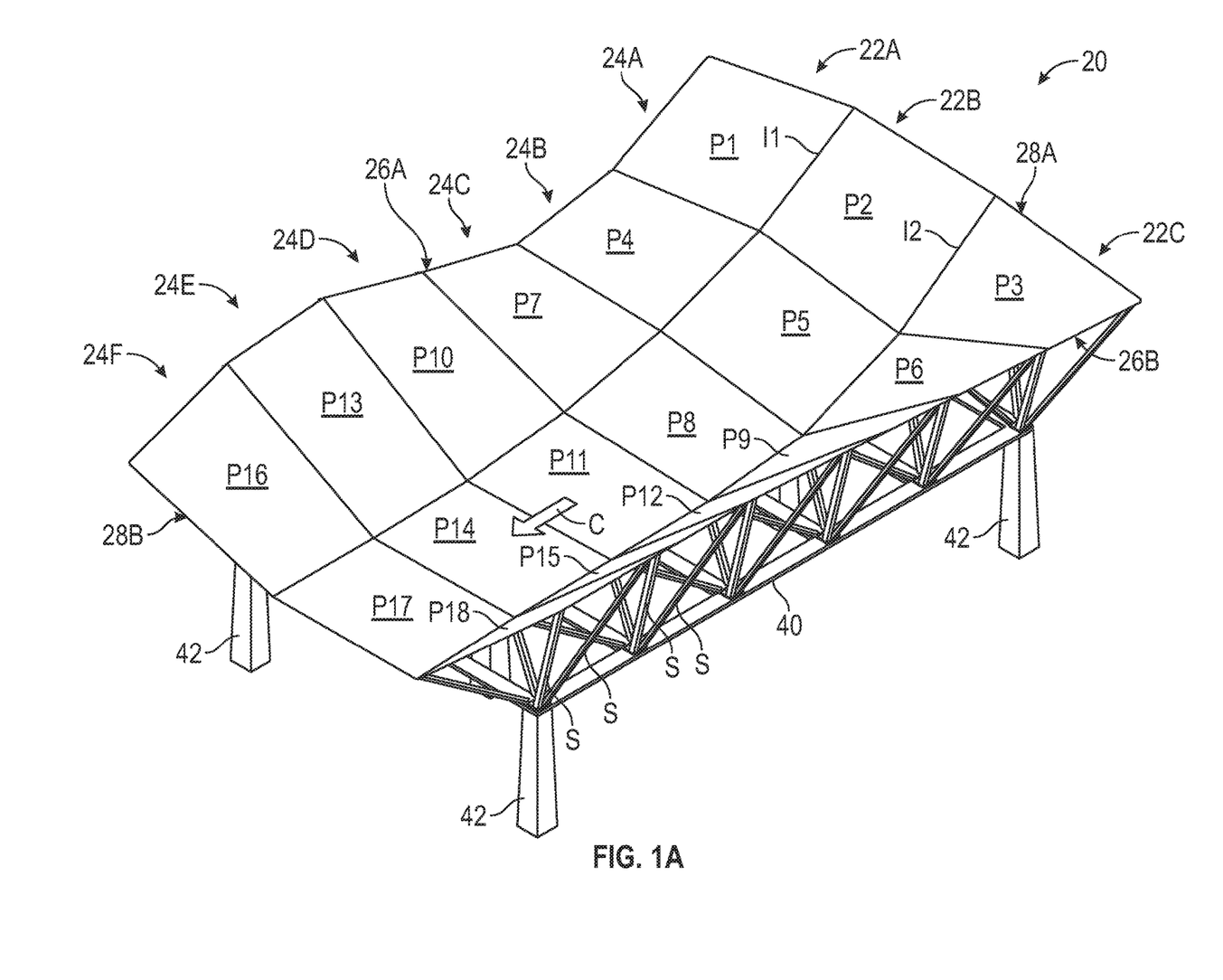
FIG. 1A is a perspective view of an example canopy.

FIG. 1A illustrates a perspective view of an example canopy 20. The canopy 20 includes a plurality of panels P arranged in a plurality of sequences 22A-C and a plurality of rows 24A-F. As used herein, each "sequence" is a row that is transverse to one of the rows 24A-F. In the example of FIG. 1A, there are three sequences 22A-C and six rows 24A-F, which provide 18 panels P1-P18. The panels P1-P18 provide for a tessellated top surface of the canopy 20.

Sequence 22B is disposed between sequences 22A and 22C, and forms a rainwater collection channel schematically shown as C in FIG. 1A. The first and third sequences are angled with respect to the second sequence to take advantage of gravity and direct rainwater towards the rainwater collection channel C. Photovoltaic cells, which are not shown in FIG. 1A, are provided on a top surface of some or all of the panels P1-P18. By providing for both energy collection and rainwater harvesting, the canopy 20 is a "hybridized" canopy. In some examples, the canopy 20 is a hybridized net zero energy (HNZE) structure because the canopy creates more renewable energy that it uses.

The canopy 20 includes a canopy support frame 40, and a plurality of support posts 42 that support and elevate the canopy support frame 40. A plurality of struts S interconnect the canopy support frame 40 to the individual panels P. The canopy support frame 40, support posts 42, and struts S collectively form a support structure for the plurality of panels P. In one example, the canopy support frame 40, support posts 42, or both, are hollow.

Figure 1B:
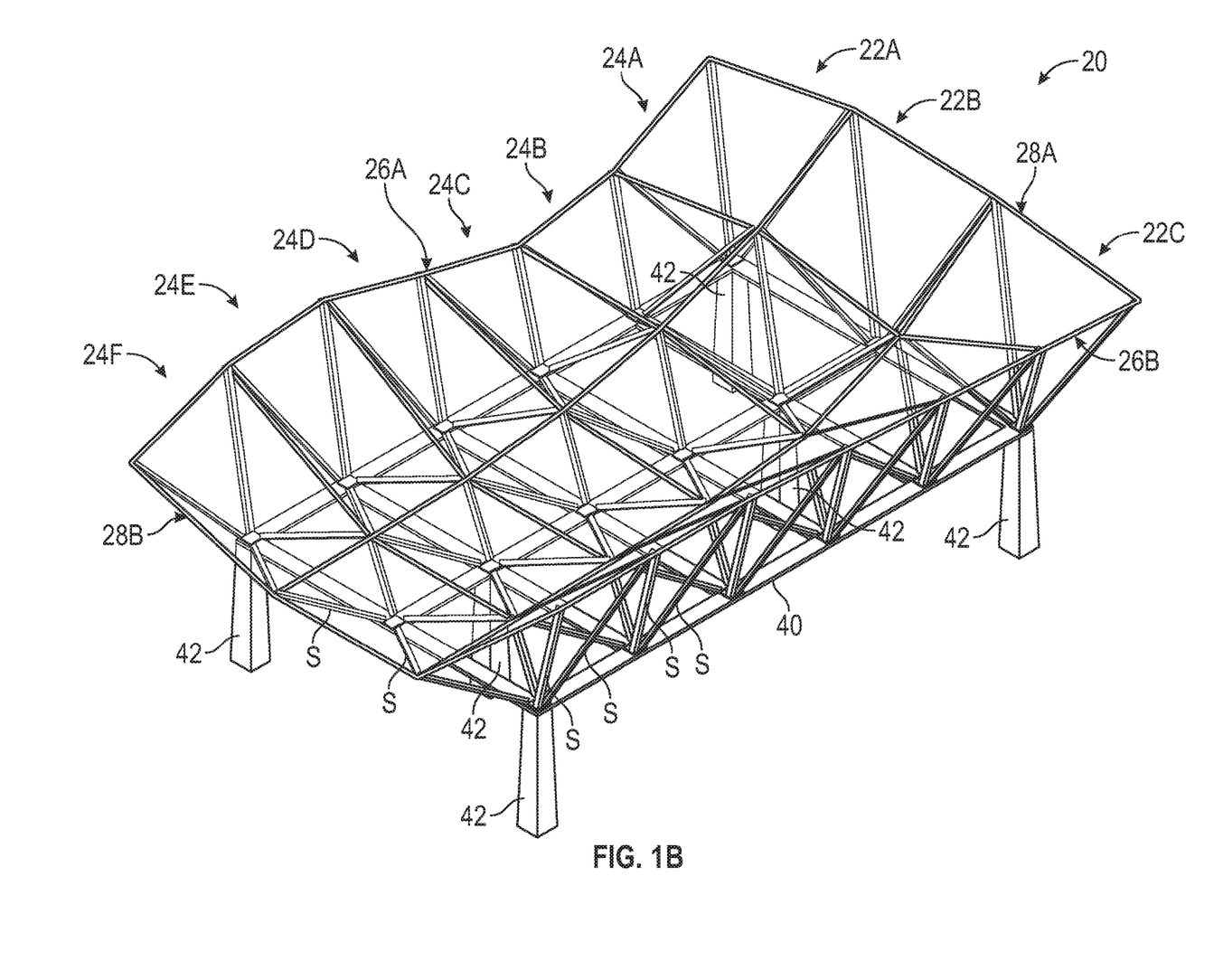
FIG. 1B is a perspective view of a support structure of the canopy of FIG. 1A.

FIG. 1B illustrates a view of the canopy 20 in which the panels 20 are depicted as being transparent for the purpose of illustrating the support structure. In the example of FIG. 1B, the canopy support frame is supported by six support posts 42 clustered towards the ends 28A-B of the canopy 20, which maximizes accommodation for uses beneath the canopy 20 such as gardening, agricultural use, and/or as gathering place for events. The perimeters of the canopy 20 allows sunlight to reach the ground plane to facilitate such uses.

Figure 2:
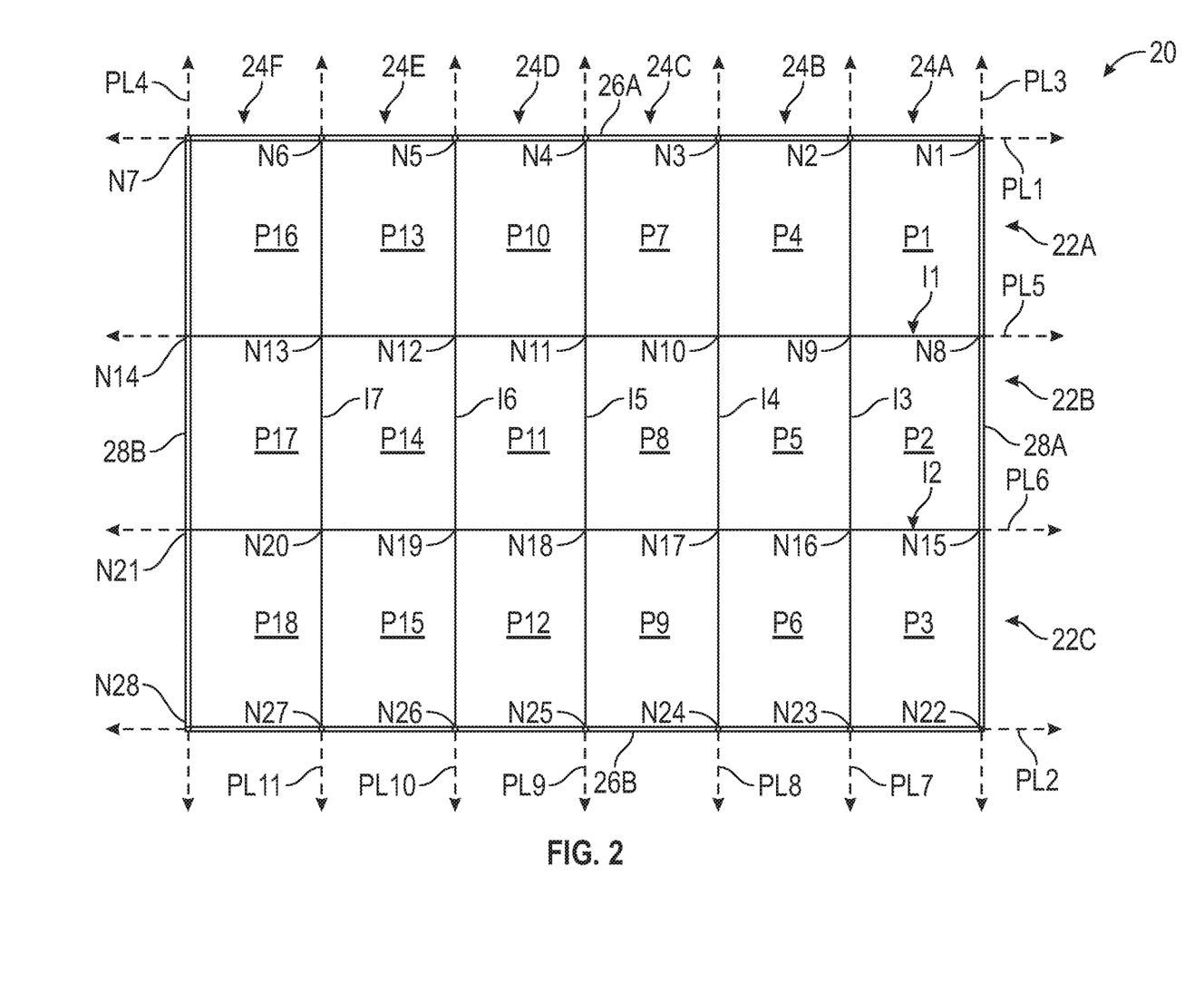
FIG. 2 is a top view of the canopy of FIG. 1A.

FIG. 2 is a top view of the canopy 20 of FIGS. 1A-B. FIG. 2 illustrates the plurality of panels P1-P18 and their respective sequences 22A-C and rows 24A-F. Referring now to FIG. 2 with continued reference to FIGS. 1A-B, the canopy 20 includes opposing edges 26A and 26B that are sloped with respect to the canopy support frame 40, and each row 24A-F extends from the edge 26A to the edge 26B. In the example of FIG. 2, the edge 26A lies within a plane PL1, and edge 26B lies within a plane PL2 that is approximately parallel to the plane PL1.

The canopy 20 also includes opposing ends 28A and 28B that are sloped with respect to the canopy support frame 40, and each sequence 22A-C extends from end 28A to end 28B. In the example of FIG. 2, end 28A lies within a plane PL3 and end 28B lies within a plane PL4. Planes PL3 and PL4 are approximately parallel to each other and are approximately perpendicular to planes PL1 and PL2. The panels of the sequence 22B are sloped with respect to the canopy support frame 40, and in particular are sloped downward from end 28A to end 28B, which contributes to the rainwater collection channel C by directing rainwater to the end 28B of panel P17.

Sequence 22A meets the sequence 22B at a sequence interface I1 that is sloped with respect to the canopy support frame 40 and disposed within a plane PL5. Sequence 22C meets sequence 22B at a sequence interface I2 that is sloped and disposed within a plane PL6. Planes PL1, PL2, PL5, and PL6 are approximately parallel to one another.

The plurality of rows 24A-E meet each other at respective row interfaces I3-I8 which are sloped with respect to the canopy support frame 40 and disposed within planes PL7-PL11. The plurality of row interfaces I3-I8 are disposed within respective planes PL7-PL11 that are approximately parallel to one another and to planes PL3 and PL4.

In one example, the canopy is provided as a kit that includes the plurality of rows 24A-F of panels, and purchasers can assemble the rows 24 to form the canopy 20, with the assembly including optionally providing of a seal between the rows 24.

Figure 1C:
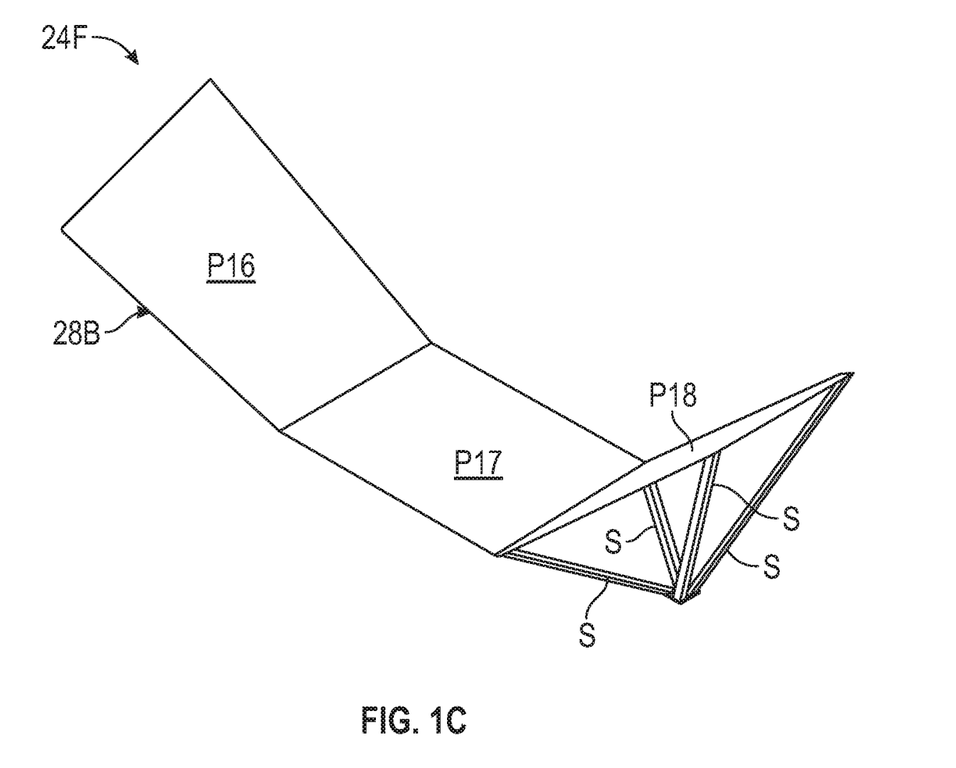
FIG. 1C is a perspective view of a row—a portion of the example canopy of FIG. 1A.

FIG. 1C illustrates an example in which row 24F (FIGS. 1A and 1B) is provided as a tri-module unit. Row 24F and the other rows 24A-E could be similarly provided as tri-module units as part of a kit, and could be assembled onsite by fastening the row 24 to the canopy support frame 40. Optionally, the assembly could include provision of a seal between the rows 24 (e.g., through direct contact, a seal, or both direct contact and a seal).

In another example, the canopy is provided as a kit that includes the plurality of sequences 22A-C of panels, and purchasers can assemble the sequences 22 to form the canopy 20, with the assembly including optionally providing a seal between the sequences 22 (e.g., through direct contact, a seal, or both direct contact and a seal).

The use of either of the kit examples discussed above provides for easy assembly of the canopy 20, and also convenient disassembly, decommissioning, and winterizing of the canopy 20 to avoid impacts from freeze thaw in certain climates. The kit embodiments also allow for ease of repair and replacement if damage occurs.

As shown in FIG. 2, nodes N1-N28 are provided at the corners of each panel P1-P18. The nodes N1-N28 are provided at different elevations. Table 1 below illustrates a plurality of different non-limiting example elevations for the nodes N1-N28.

TABLE 1

| Node | Elevation |
|---|---|
| N1 | 627.09 |
| N2 | 624.13 |
| N3 | 623.15 |
| N4 | 624.55 |
| N5 | 626.11 |
| N6 | 625.61 |
| N7 | 623.48 |
| N8 | 628.73 |
| N9 | 625.43 |
| N10 | 623.15 |
| N11 | 621.77 |
| N12 | 621.18 |
| N13 | 621.08 |
| N14 | 620.98 |
| N15 | 628.48 |
| N16 | 624.19 |
| N17 | 621.84 |
| N18 | 621.28 |
| N19 | 621.18 |
| N20 | 621.08 |
| N21 | 620.98 |
| N22 | 627.42 |
| N23 | 627.74 |
| N24 | 628.07 |
| N25 | 628.44 |
| N26 | 628.73 |
| N27 | 628.82 |
| N28 | 628.73 |

The values of Table 1 demonstrate an example in which each of the edges 26A-B and the interfaces I1, I2 are sloped, in which a majority of the edge 26B has a greater height than a majority of the edge 26A, and a majority of the end 28A has a greater height than a majority of end 28B.

In one example, a height of the canopy support frame 40 is at least six feet above finished grade to accommodate the average height of most users.

Within each row 24A-F, the interfaces I1, I2 may provide for direct contact between adjacent panels. In another example, an additional element is disposed between adjacent panels in a row 24 to provide the interface I1 and/or I2, such as a contact seal. In one example, even where direct contact is provided between adjacent panels, a seal may still be provided between the adjacent panels to prevent rainwater from leaking between one or more of the sequence interfaces I1-I2.

Similarly, within each sequence 22A-C, the interfaces I3, I4 may provide for direct contact between adjacent panels. In another example, an additional element is disposed between adjacent panels in a sequence 22 to provide the interface I3 and/or I4, such as a contact seal. In one example, even where direct contact is provided between adjacent panels, a seal may still be provided between the adjacent panels to prevent rainwater from leaking between one or more of the row interfaces I3-I7.

Figure 3:
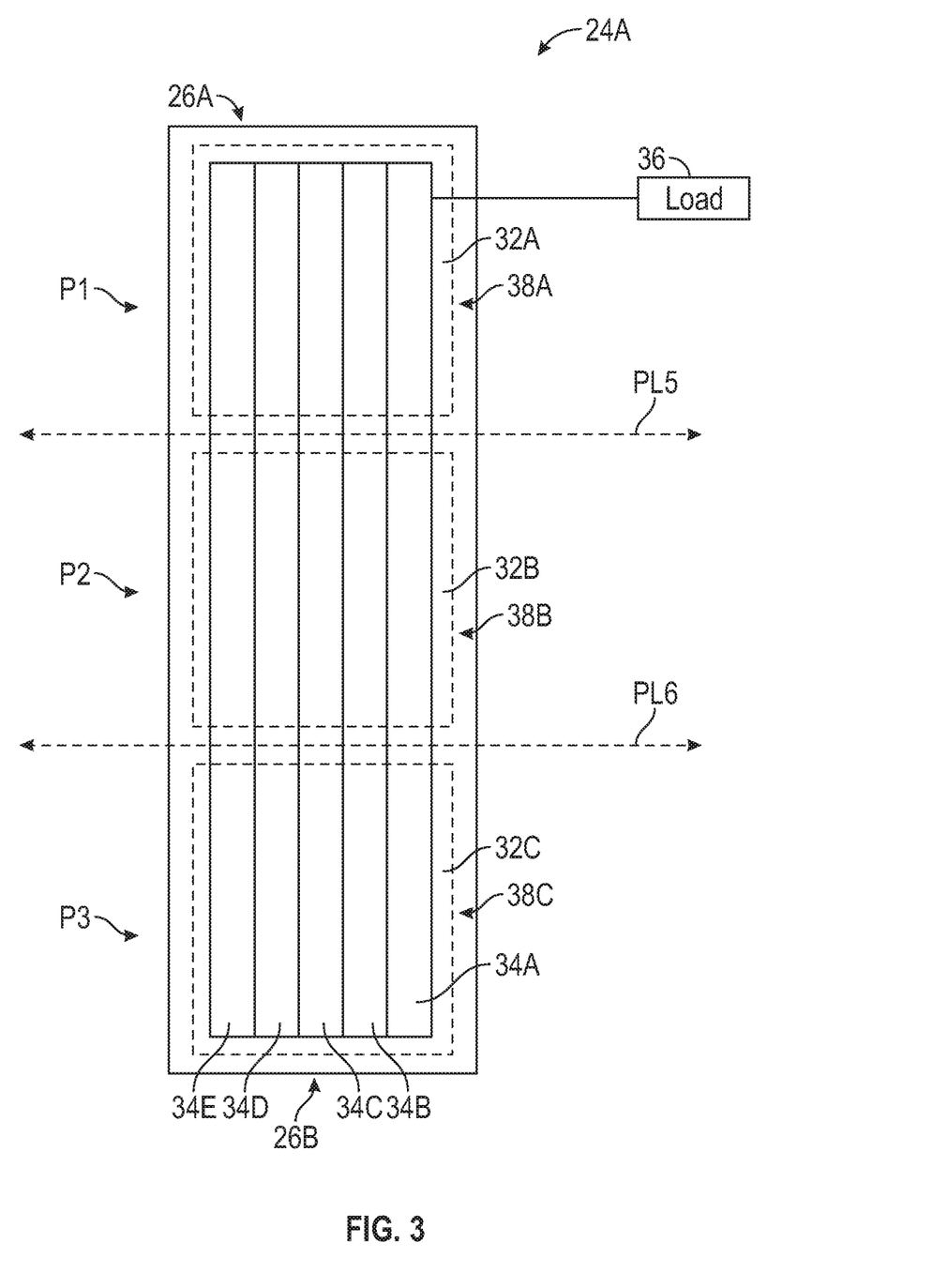
FIG. 3 illustrates a top view of a single row of the canopy of FIG. 1A according to one example.

FIG. 3 illustrates a top view of the row 24A of panels P1-P3 according to one example. In the example of FIG. 3, each panel P1-P3 includes a respective substrate 32A-C onto which a plurality of photovoltaic strips 34A-E are adhered. The photovoltaic strips 34A-E are arranged in a plurality of rows that are generally parallel to each other. The photovoltaic strips 34A-E are electrically coupled to each other and to a load 36, such as an energy storage device (e.g., a battery) or an electrical grid. Although not shown, the photovoltaic cells of other ones of the panels could also be connected to the strips 34A-E and the load 36.

Each panel P1-P3 is supported by a respective panel support frame 38A-C to which the substrate 32 is attached (e.g., through ultrasonic welding). In one example, one or more of the support panel support frames 38A-C of a given row 24 can be mounted to each other, integrally formed with each other (e.g., through a casting process), or connected with an intermediate component such as a seal. Similarly, in one example, one or more of the panel support frames 38 of a given sequence 22 can be mounted to each other, integrally formed, or connected with an intermediate component such as a seal. In one example, some or all of the panel support frames 38 are hollow.

In one example, the substrate 32 of each panel P is a fabric substrate. In one example the fabric substrate includes a sailcloth that is fire retardant, includes a water repellant coating, and is UV stable when exposed to UV rays (e.g., WeatherMAX FR). In one example, the photovoltaic strips are formed of the FLEX SERIES-03N film from MiaSole. In one example (such as either of the kit examples discussed above), the fabric used as the substrate 32 for adjacent panels in a sequence 22 or row 24 may be a single piece of fabric (e.g., a single piece of fabric for an entire sequence 22 or a single piece of fabric for an entire row 24). In a further example, a single piece of fabric is used as the substrate 32 for the entire canopy 20.

In another example, instead of using photovoltaic film, some other flexible photovoltaic device is utilized for one or more of the panels P (e.g., one that utilizes a perovskite solar cell).

Figure 4:
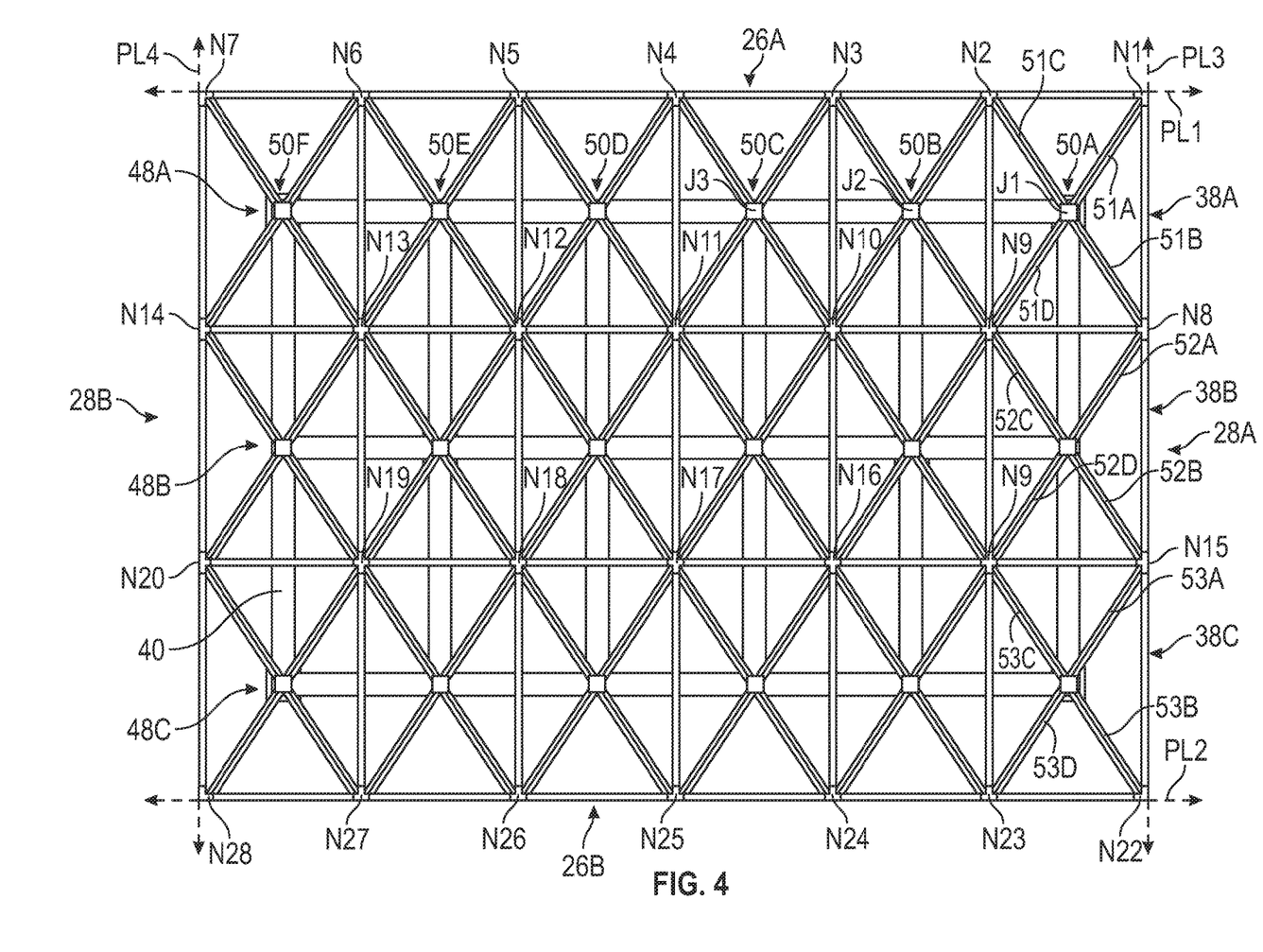
FIG. 4 illustrates the top view of FIG. 2 but with a substrate of each panel removed to expose an underlying support structure.

FIG. 4 illustrates the top down view of FIG. 2 but with the substrate 32 of each panel P removed. FIG. 4 illustrates the canopy support frame 40, panel support frames 38, and the plurality of struts S. Each panel support frame 38 is supported by four struts S1-S4 that connect the panel support frame 38 to the canopy support frame 40. For example, panel support frame 38A is supported by struts S1A, S2A, S3A, and S4A. In the example of FIG. 4, the struts S of each panel support frame 38 are secured to the corners of their associated panel support frame 38 (e.g., through welding, casting, or fastening).

As shown in FIG. 4, the canopy support frame 40 includes a plurality of sequences 48A-C that extend between and are approximately parallel to the planes PL1 and PL2. The canopy support frame 40 also includes a plurality of rows 50A-F that extend between and are approximately parallel to the planes PL3 and PL4. The various struts S interconnect the canopy support frame 40 to the panel support frames 38.

Figure 5:
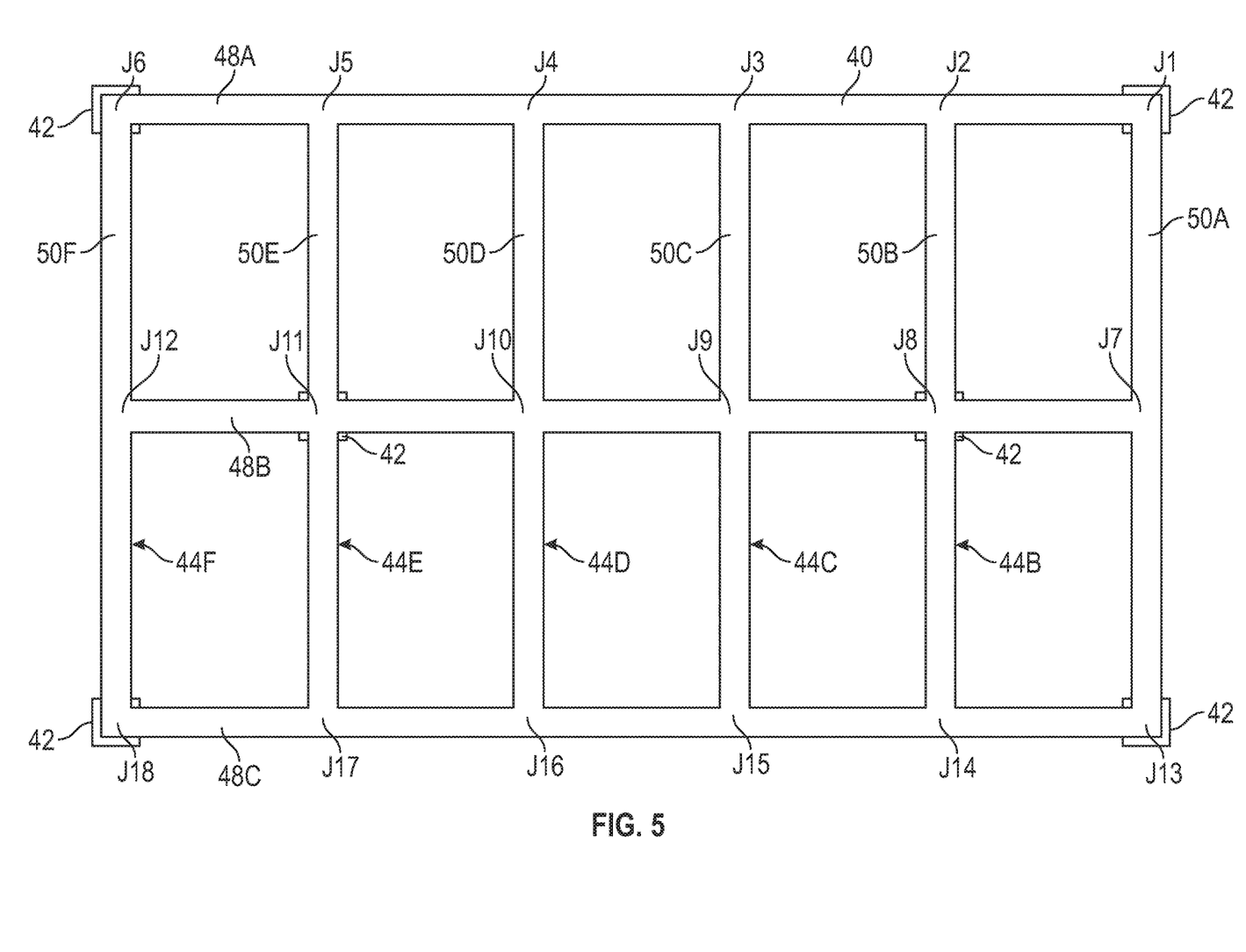
FIG. 5 illustrates the top view of FIG. 4 but with a portion of the support structure removed.

Referring now to FIG. 5, a top view of just the canopy support frame 40 is provided with a portion of the support structure including the panel support frames 38 and struts S removed. As shown in FIG. 5, the sequences 48A-C and rows 50A-F met at a plurality of junctions J1-J18. In the example of FIGS. 1A-B and FIG. 5, the support posts 42 are provided beneath each of the junctions J1, J6, J8, J11, J13, and J18. Of course, it is understood that FIG. 5 is only an example and that support posts 42 could be provided at other locations.

In one example, apertures are provided in the canopy 20 facilitate sunlight passing through the canopy 20.

Figure 6:
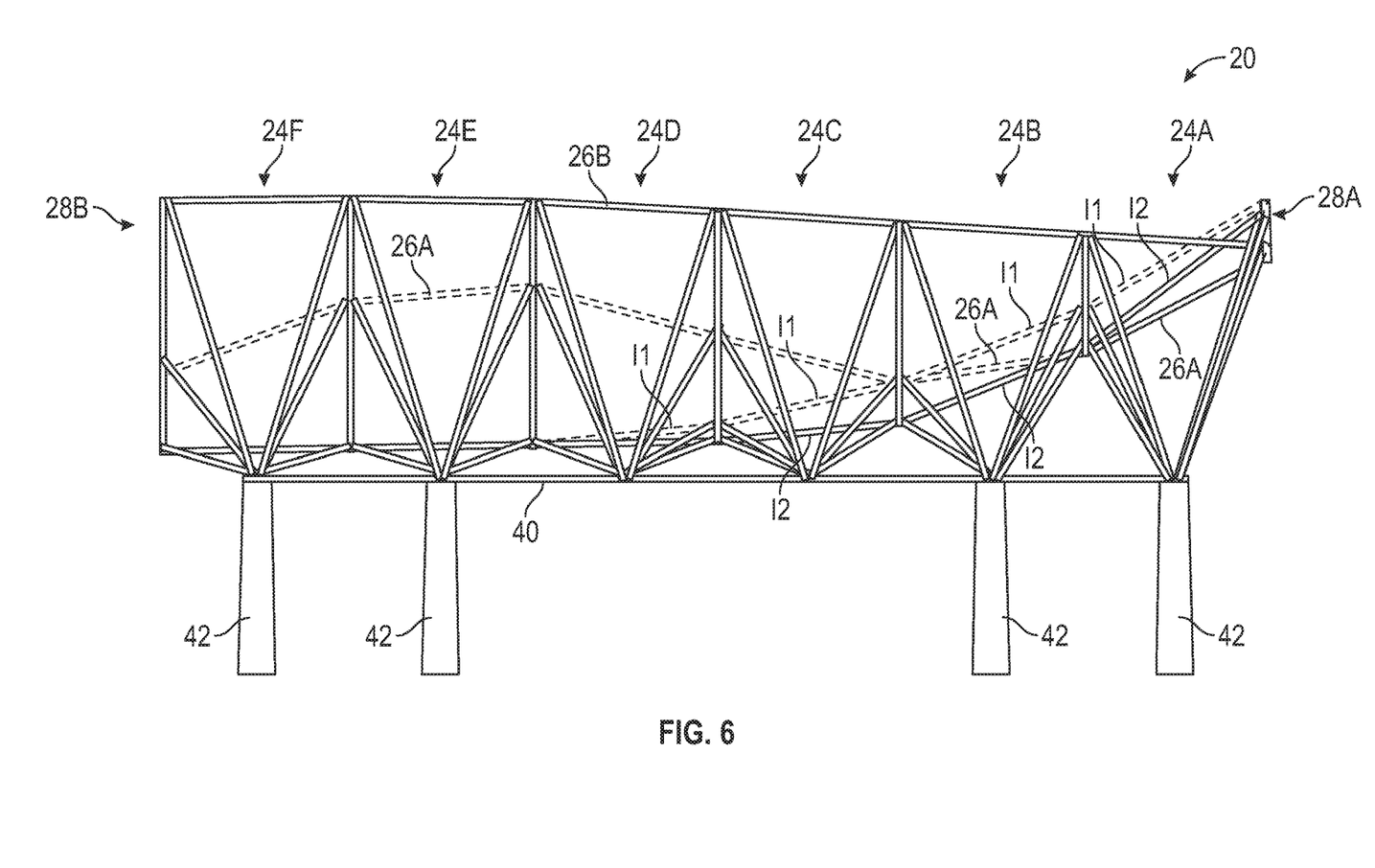
FIG. 6 illustrates a side view of the canopy of FIG. 1A.

FIG. 6 illustrates a side view of the canopy 20 constructed according to the values in Table 1. As shown in FIG. 6, each of the edges 26A-B and the interfaces I1, I2 are sloped with respect to the canopy support frame 40. Also, as shown in FIG. 6, a majority of the edge 26B has a greater height than a majority of the edge 26A.

Figure 7:
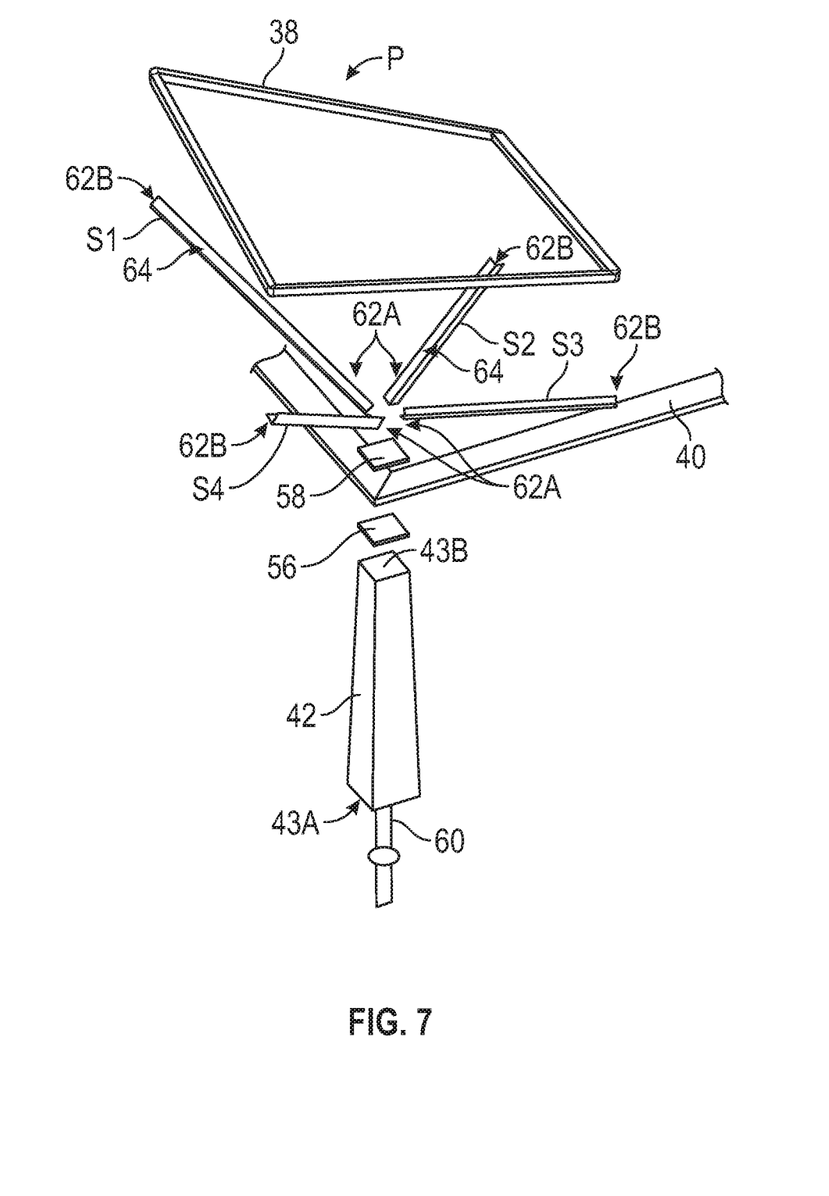
FIG. 7 illustrates an exploded view of a portion of the canopy of FIG. 1A according to one example.

FIG. 7 is an exploded view of a portion of the canopy 20 including a panel P, a portion of the canopy support frame 40, and a support post 42, but omitting the substrate 32 of the panel P. As shown in FIG. 7, the support post 42 includes a first end 43A and an opposing second end 43B, and the support post tapers from the first end 43A to the second end 43B. In the non-limiting example of FIG. 7, the support post 42 is a tapered square sequence. Of course, other support post 42 shapes could be utilized.

A first support plate 56 is disposed between the end 43B of support post 42 and the canopy support frame 40. A second support plate 58 is disposed between the canopy support frame 40 and the plurality of struts S1-S4. The struts are secured to the second plate 58 (e.g., by welding or fastening). The struts S1-S4 and the first support plate 58 collectively create a yoke assembly which supports the panel P. A helical pile 60 is used to provide a foundation for the support post 42. In one example, one or more of the canopy support frames 40, struts S, support plates 56/58, and panel support frames 38 are composed of steel.

Each strut S1-S4 includes a first end 62A that is secured to the canopy support frame 40 via the plate 58, and an opposing second end 62B that is secured to the panel support frame 38. As shown in FIG. 7, the panel support frame 38 can be which is four-sided. In the example of FIG. 7, each strut S is V-shaped and forms a respective channel that faces towards the panel support frame 38.

Figure 8:
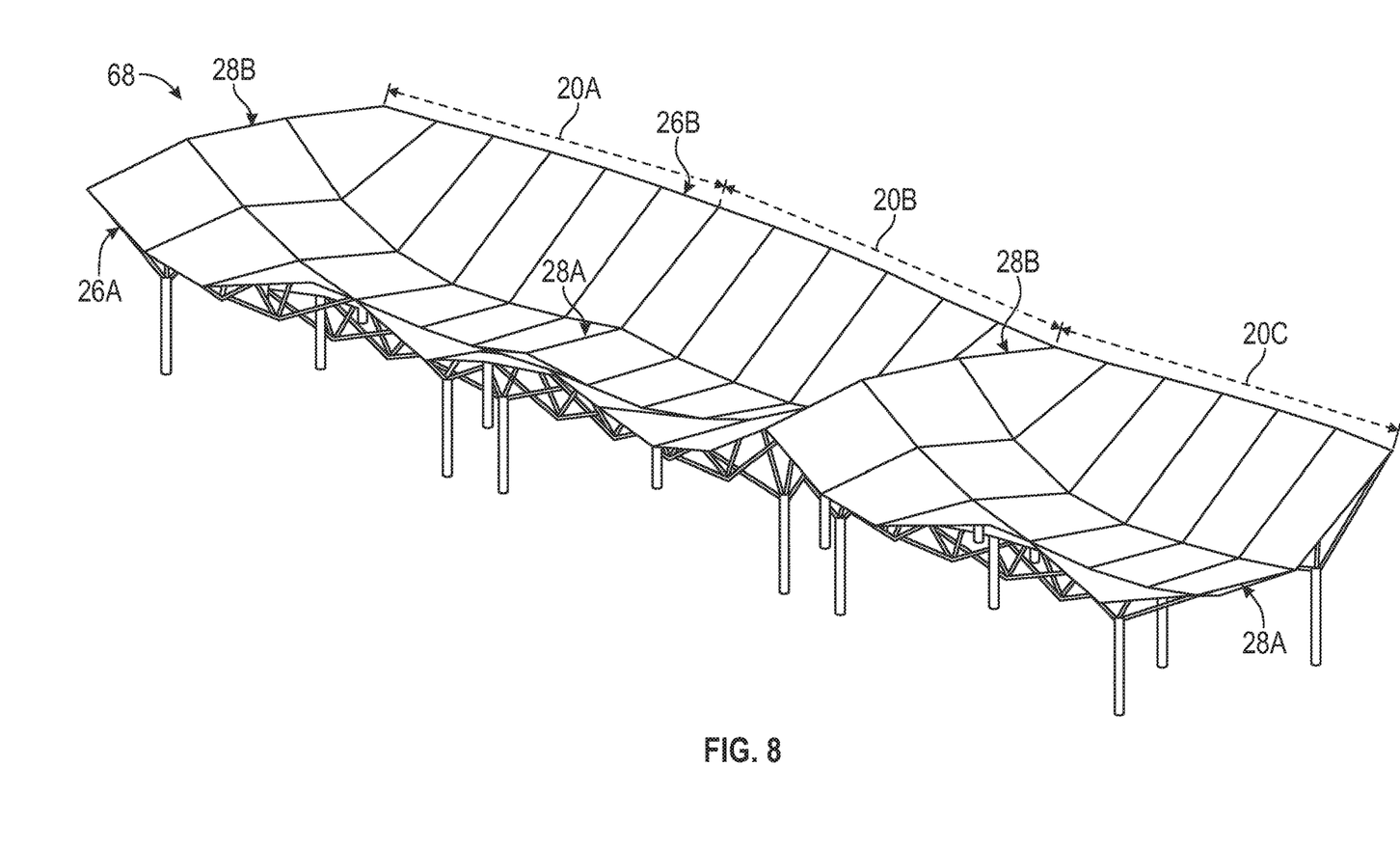
FIG. 8 illustrates an example extended canopy that includes a plurality of the solar canopies from FIG. 1A.

FIG. 8 illustrates an example in which a plurality of the solar canopies are arranged adjacent to one another in an end-to-end arrangement as canopy units to form an extended canopy 68 to maximize site usage and collection efficiency. In the example of FIG. 8, ends 28A of solar canopies 20A and 20B are arranged adjacent to one another, and ends 28B of solar canopies 20B and 20C are arranged adjacent to one another.

Figure 9:
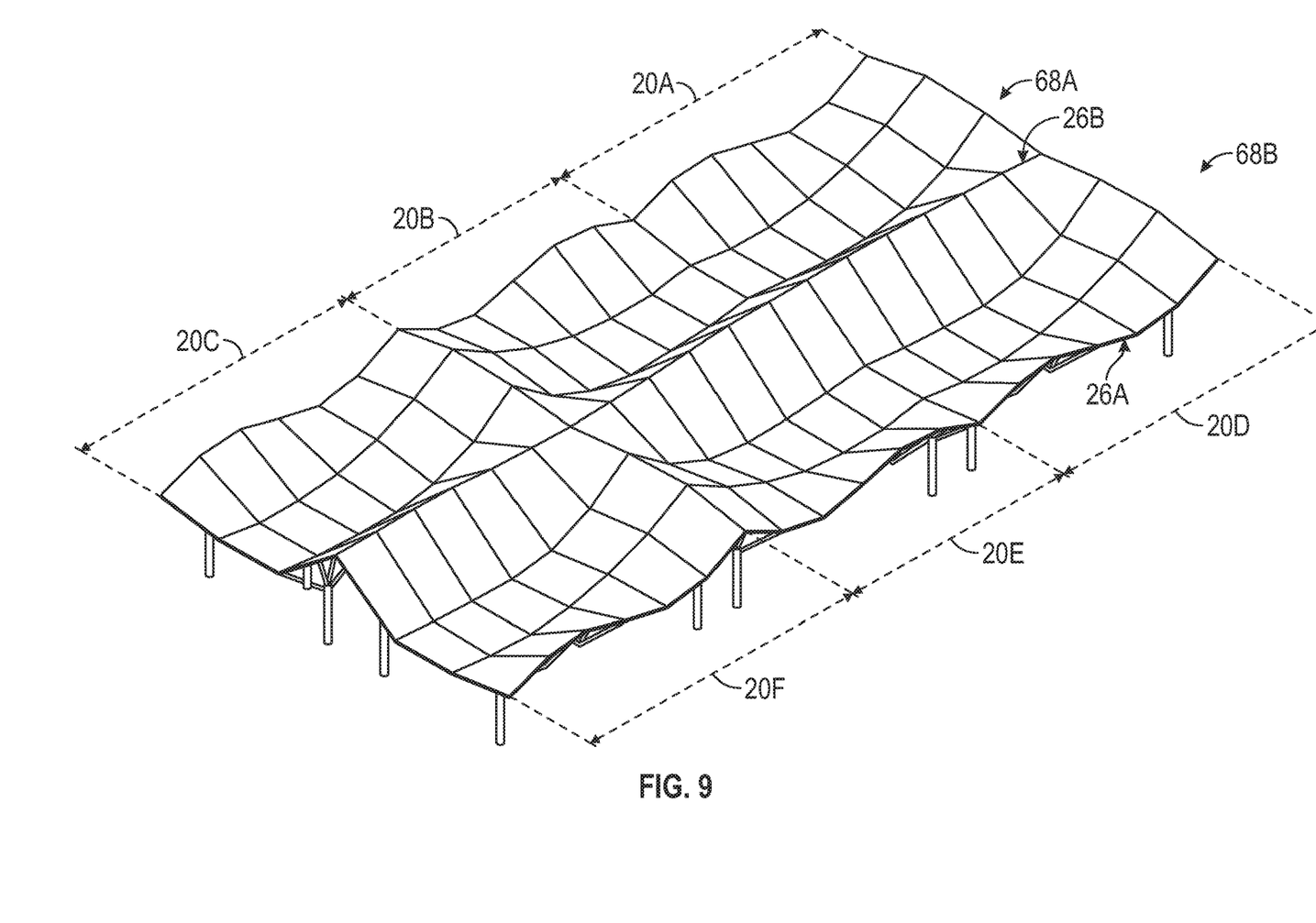
FIG. 9 illustrates another example extended canopy that includes a plurality of the solar canopies from FIG. 1A.

FIG. 9 illustrates an example in which two of the extended canopies 68A-B are arranged adjacent to each other, with the edge 26B of the extended canopies 68A-B arranged adjacent to one another. As shown in FIGS. 8-9, the solar canopies 20 can be arranged adjacent to one another end-to-end, side-by-side, or both, again, to maximize site usage and collection efficiency.

In this disclosure, like reference numerals designate like elements where appropriate and reference numerals with the addition of one-hundred or multiples thereof designate modified elements that are understood to incorporate the same features and benefits of the corresponding elements.

Figures 10A, 10B, 11:
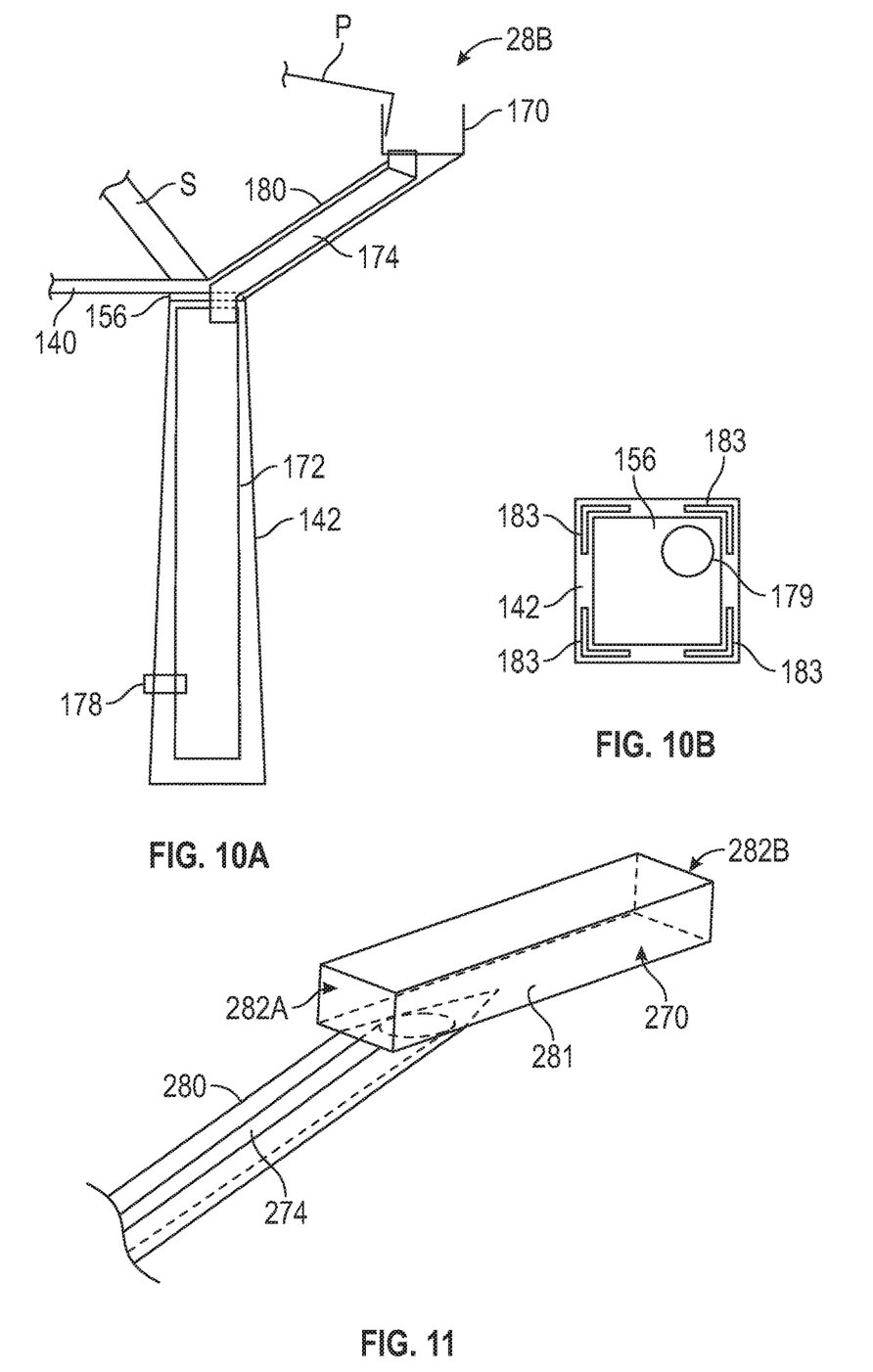
FIG. 10A illustrates the primary example rainwater collection configuration with internal bladder cistern.
FIG. 10B illustrates a plate for the primary configuration of FIG. 10A.
FIG. 11 illustrates an example gutter that can be used in the configuration of FIG. 10A.

FIG. 10A illustrates a primary example rainwater collection configuration which can be utilized with the canopy 20. As shown in FIG. 10A, a gutter 170 is provided that drains into a cistern 172 within support post 142. The rainwater collection channel C (see FIG. 1A) is angled and in fluid communication with the cistern 172 through a gutter 170 and a conduit 174, which may be made of PVC pipe. In one example, the gutter 170 is disposed at the end 28B of the canopy 20 along panel P17 between sequence interfaces I1 and I2. The conduit 174 is disposed within one of the V-shaped struts S identified with numeral 180 for support.

In one example, the cistern 172 is a bladder which may be composed of an ultra-high molecular weight polyethylene (UHMWPE) fiber (e.g., Cuben Fiber). The cistern 172 may include a faucet and/or tap, schematically shown as 178 in FIG. 10, to release collected rainwater. In one example the support post 42 shown in FIG. 10 is the support post beneath junction J1, J6, J8, J11, J13, or J18. Thus, the canopy 20 can provide for water drainage, conveyance, collection, and distribution.

The use of a cistern which is non-fixed and non-buried but rather is lightweight and "portable" in a rainwater management system for irrigation and other non-potable uses has advantages for ease of use and maintenance.

Referring now to FIG. 10B with continued reference to FIG. 10A, top view of a support plate 156 is shown which includes an opening 179 to provide for fluid communication between the gutter 170 and the cistern 172. Struts S can mount to the plate 156 at locations 183.

The cistern 172 may include a faucet and/or tap, schematically shown as 178 in FIG. 10A, to release collected rainwater.

FIG. 11 illustrates an example gutter 270 that can be used in the configuration of FIG. 10A. As shown in FIG. 11, the support strut 280 and conduit 274 are angled with respect to a bottom surface 281 of the gutter 270. The gutter 270 extends between opposing first and second faces 282A-B. In one example, the faces 282A-B are disposed in or between the planes PL5 and PL6 of sequence interfaces IL I2.

Figure 12:
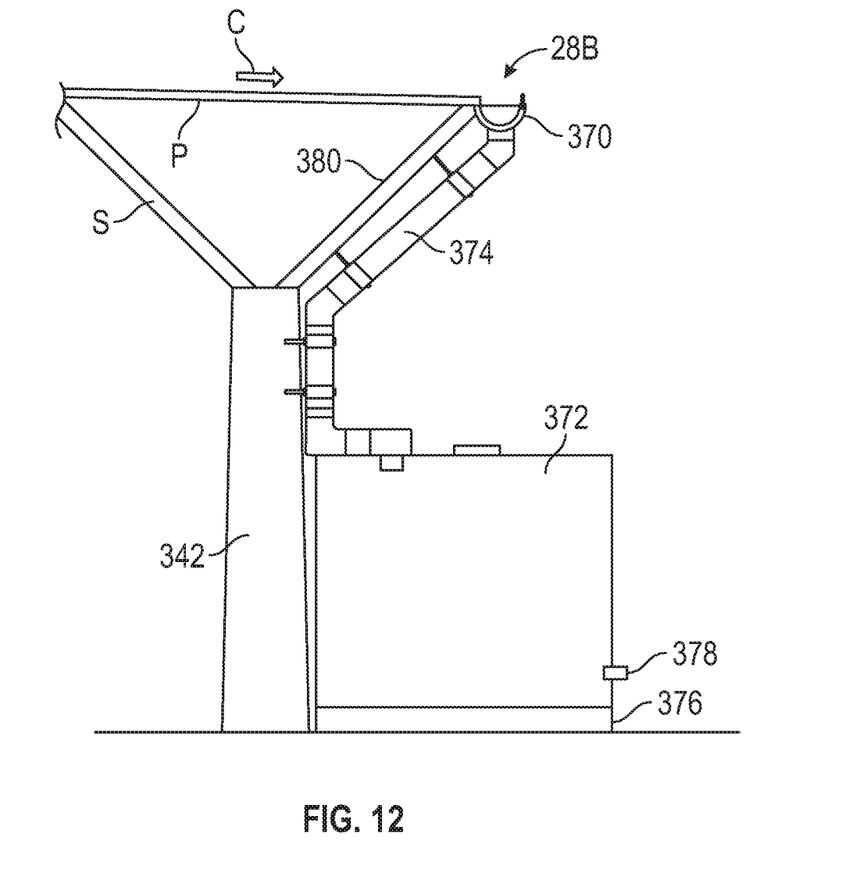
FIG. 12 illustrates another example rainwater collection configuration with exterior cistern.

FIG. 12 illustrates another alternate example rainwater collection configuration which can be utilized with the canopy 20. As shown in FIG. 12, a gutter 370 is provided that drains into a cistern 372. The rainwater collection channel C is in fluid communication with the cistern 372 through the gutter 370 and a conduit 374, which may be made of PVC pipe. The cistern 372 may be elevated on a stand 376 to position the cistern 372 between the ground and the gutter 370. In one example, the gutter 370 is disposed at the end 28B of the canopy 20 along panel P17 between sequence interfaces I1 and I2. The conduit 374 is mounted to one of the struts S identified with numeral 380 for support.

Here too, the cistern 372 may be a container which may be a plastic tote or composed of an ultra-high molecular weight polyethylene (UHMWPE) fiber (e.g., Cuben Fiber). Also, the cistern 372 may include a faucet and/or tap, schematically shown as 378 in FIG. 12, to release collected rainwater. In one example, the support post 342 shown in FIG. 10 is the support post beneath junction J1, J6, J8, J11, J13, or J18.

If the gutter 170/270/370 is provided along end 28B of the canopy, gaps may be provided between adjacent ones of the solar canopies that abut are adjacent along end 28B in the extended arrangements of FIGS. 8-9 (e.g., between canopies 20A and 20B and/or between canopies 20D and 20E).

As discussed above, the canopy support frame 40, panel support frames 38, and/or support posts 42 can be hollow. The use of hollow components reduces weight and material costs. The use of a fabric for the substrate 32 of each panel P further reduces weight. The reduced weight can reduce shipping costs and provide for easier assembly (e.g., in the kit embodiments described above).

The canopy 20 discussed above provides for a lightweight, hybridized collection surface, or "solar sail," which allows elevation high above the ground plane (above head height). Utilizing photovoltaic film (non-ridged panels) to a flexible and unconventional substrate (e.g., a UV stable and fire-retardant fabric) provides for a "roof less" canopy application.

The use of lightweight materials to create the collection surface, or solar sail, allows in turn the minimization of steel structure (only 5 sections, namely, in one example, the plates 56/58, canopy support frame 40, struts S, panel support frames 38, and support posts 42) and the simplification of mechanical connections for ease of fabrication which provides for convenient assembly, field installation, replacement, and maintenance of the canopy 20.

The canopy 20 also provides for savings and user value because the photovoltaic cells provide for a reduction in the cost per kilowatt hour over traditional electrical power from a utility company, and the collected rainwater can reduce irrigation and gray water costs.

The integrated water management system provided by the canopy 20 uses the canopy support frame 40, struts S, and support posts 42 to carry the conveyance and storage components. Also, unconventional lightweight and durable materials can be used, such as an UHMWPE cistern bag or "bladder."

As discussed above, the canopies can be ganged together "back-to-back" or "side-by-side" to address diverse site conditions and satisfy power requirements.

The particular example depicted in Figs. 1A-B is parametrically optimized to provide an irregular, tessellated canopy surface for maximizing the collection of solar energy and rainwater, including the collection, conveyance, and distribution of rainwater, and facilitating of drainage from the canopy:20 to a cistern.

As discussed above, the substrate 32 can be a solar sail which can be ultrasonically welded to the panel support frame 38A-C, which can be hollow and/or tubular.

As discussed above, the canopy system may be grid-tied but is also compatible with on-site battery storage solutions.

The water management system is easily decommissioned and winterized to avoid impacts from freeze thaw in site contexts which experience temperatures below 32 degrees F./0 degrees C.

Ground plane uses below the canopy are more diverse than parking lots. By elevating the collection surface, an open, flexible and unimpeded public realm is created which supports agricultural/gardening, educational, training, civic, community, and celebratory uses. Thus, the lightness of the "solar sail" and structure allows for opening up the ground plane and provide for many more diverse uses (beyond parking).

The kit embodiments discussed above, such as the "tri-module" embodiment (one example tri-module is shown in FIG. 1C) provides for convenient shipping of the canopy components for onsite assembly. In one example, a majority of the assembly connections of the canopy 20 are mechanical, with only a subset of the connections being welded in the shop or field (e.g., those of the struts S to their respective panel support frames 38 and of the struts S to their respective plates 58). This creates accessibility and participation for non-trade workers. Any average strength, able-bodied, youth and/or adult can participate in the fabrication and installation of the HNZE canopy.

In the particular kit embodiment described above in which tri-module assemblies are used, six unique assemblies (one for each row 24) can be provided for onsite assembly, and the various canopy components can be sized to be easily and affordably shipped to site for installation.

The design described above minimizes necessary site work in footings and uprights/sequences because of the reduction in weight of the "solar sail" collection surface.

The lightness and affordability of the canopy system allows shipment, installation, and use in diverse, resource constrained site contexts.

Although example embodiments have been disclosed, a worker of ordinary skill in this art would recognize that certain modifications would come within the scope of this disclosure. For that reason, the following claims should be studied to determine the scope and content of this disclosure.

What is claimed is:
1. A canopy comprising:
a plurality of panels arranged in a plurality of rows and a plurality of sequences, including a first sequence, second sequence, and a third sequence, the second sequence disposed between the first and third sequences and providing a rainwater collection channel;
wherein the first and third sequences are angled with respect to the second sequence to direct rainwater towards the rainwater collection channel;
wherein photovoltaic cells are provided on a flexible top surface of some or all of the panels
the canopy has opposing first and second edges that are sloped, each row extending from the first edge to the second edge;
the first edge lies within a first plane, the second edge lies within a second plane, and the first and second planes are approximately parallel to each other
the canopy has opposing first and second ends, at least one of which is sloped, each row extending from the first end to the second end;
the first end lies within a third plane and the second end lies within a fourth plane;
the third and fourth planes approximately parallel to each other and approximately perpendicular to the first and second planes;
the first sequence meets the second sequence at a first interface that is sloped and disposed within a fifth plane;
the third sequence meets the second sequence at a second interface that is sloped and disposed within a sixth plane; and
the first, second, fifth, and sixth planes are approximately parallel to each other.
2. The canopy of claim 1, wherein
the plurality of rows meet each other at row interfaces that are sloped, the plurality of row interfaces disposed within respective planes that are approximately parallel to each other and the third and fourth planes.

* * * * *